D. Boswell — Mole Trap
118189
Sheet 2. 2 Sheets.
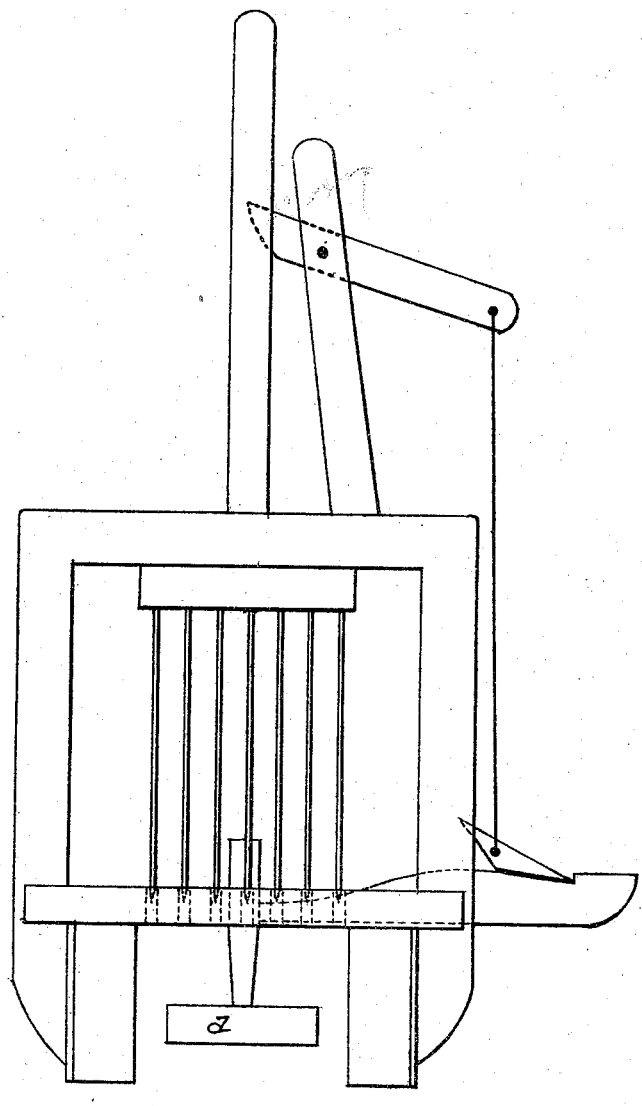
Witnesses
W. E. Raymond
Emma Greenaway
Inventor
D. Boswell by
H. W. Beadle, atty.

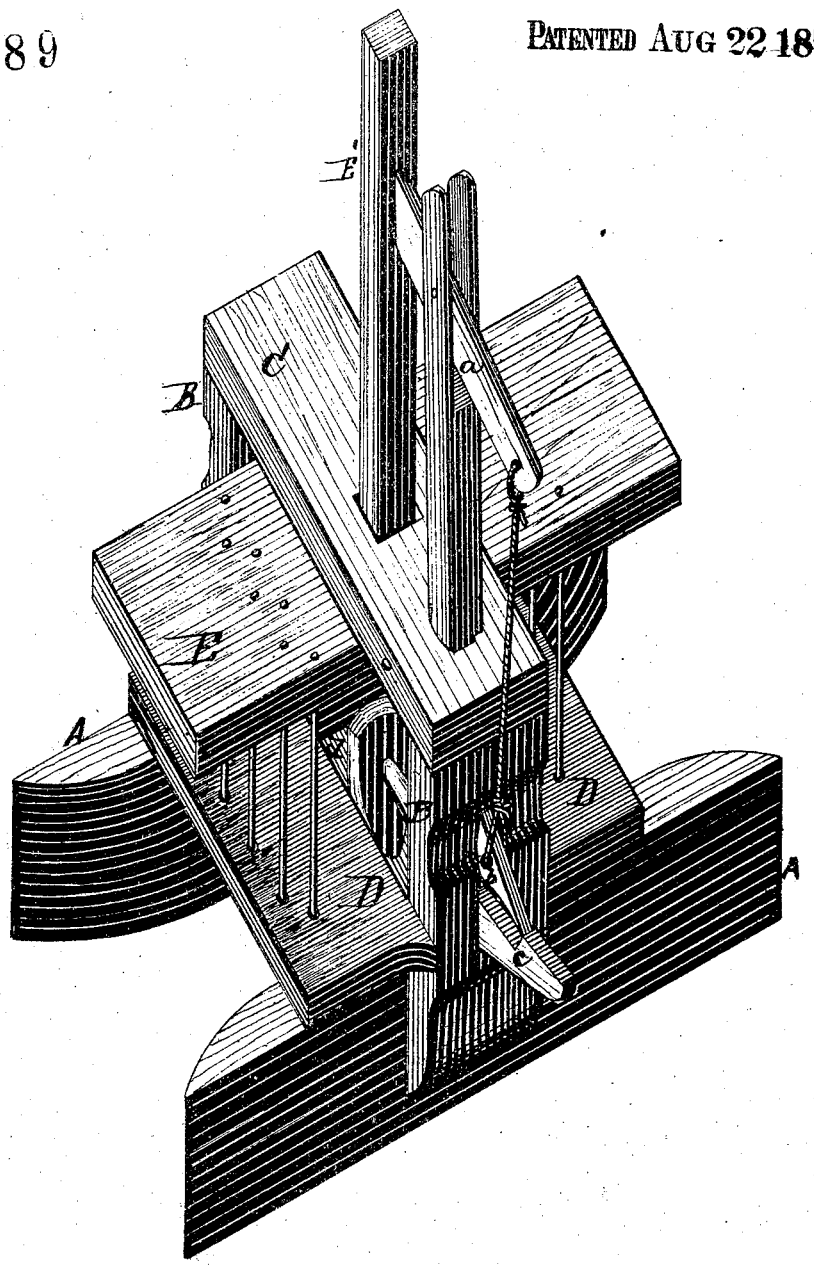

UNITED STATES PATENT OFFICE.

DANIEL BOSWELL, OF GREENCASTLE, INDIANA.

IMPROVEMENT IN MOLE-TRAPS.

Specification forming part of Letters Patent No. 118,189, dated August 22, 1871.

*To all whom it may concern:*

Be it known that I, DANIEL BOSWELL, of Greencastle, in the county of Putnam and State of Indiana, have invented a new and useful Improvement in Mole-Traps; and I do hereby declare that the following is a full and exact description of the same, reference being had to the accompanying drawing and to the letters of reference marked thereon.

This invention relates to that class of mole-traps which is provided with a drop-beam having projecting spikes for catching the animal; and consists of certain details of construction, as will be fully described hereinafter.

In the drawing, Sheet 1 shows a perspective view of my trap, and Sheet 2 a side elevation.

To enable others skilled in the art to make and use my invention, I will now proceed to describe fully its construction and operation.

A A represent two sills or beams, which support the frame-work of the trap. B B represent vertical standards rising from the sills A A on either side, which are united at the tops of the cross-bar C. D D represent cross-bars resting upon the sills A A upon each side of the standards B, which cross-bars serve to strengthen the frame and also to guide the spikes of the drop-beam in their vertical movement. E represents the drop-beam, provided with two or more rows of downwardly-projecting spikes at each end, and having also a central shaft or standard, E′, rising vertically through a suitable orifice in the cross-bar C, as shown.

The foregoing description relates to the frame of the trap and to the drop-beam. The devices for suspending the drop-beam, and for causing it to fall when the animal is properly beneath it, will now be described.

$a$ represents a lever or trigger, which is properly hung in the beam C′ rising from the cross-bar C, as shown, which trigger has its short arm adapted to rest in a notch in the standard E′, as shown. The long arm of the trigger is connected, by a rod or other proper means, a wire string being preferred, to the tumble-trigger $b$, which is adapted to rest, when the trap is set, with one of its ends in a notch in the standard B, and the other in a notch in the lever or trigger $c$, as shown. The lever $c$ is pivoted in the standard B, and has attached to its long arm, by a vertical standard, a treadle or base-plate, $d$, as shown.

The manner of catching the animal is as follows: The ground is first dug away over the track of the mole until the bottom of his furrow is exposed. The sills of the track are then placed upon the solid ground with their tapering openings located in line with the track. The earth is then thrown back loosely between the sills, and the trap is set by fixing in place the tumble-trigger $b$ and the trigger $a$. By this means the drop-beam is held up until the treadle $d$ is elevated by the mole in attempting to pass, by which means the short arm of the lever $c$ is depressed, and, consequently, the lever $a$ is free to move and the drop-beam to fall. The drop-beam should be sufficiently weighted with stones or other proper materials to insure the penetration of the spikes when the beam falls.

The trap is simple in its construction and exceedingly efficient in operation.

Having thus fully described my invention, what I claim as new, and desire to secure by Letters Patent, is—

The combination of the sills A with tapering sides, standards B, cross-beams C and D, the latter serving to guide the spikes of the drop-beam E, standards E′, trigger $a$ with its connecting-wire, trigger $b$, and trigger $c$, with bar-plate $d$, all constructed and arranged as described.

This specification signed and witnessed this 20th day of May, 1871.

DANIEL BOSWELL.

Witnesses:
 R. W. JONES,
 T. C. GROOMS.